(12) United States Patent
Sergio et al.

(10) Patent No.: US 7,755,683 B2
(45) Date of Patent: Jul. 13, 2010

(54) METHOD OF READING A CAPACITIVE SENSOR AND RELATED INTEGRATED CIRCUIT

(75) Inventors: Maximilian Sergio, Sasso Marconi (IT); Nicolò Manaresi, Bologna (IT); Marco Tartagni, Meldola (IT); Roberto Canegallo, Tortona (IT)

(73) Assignee: STMicroelectronics SRL, Agrate Brianza (IT)

( * ) Notice: Subject to any disclaimer, the term of this patent is extended or adjusted under 35 U.S.C. 154(b) by 2237 days.

(21) Appl. No.: 09/994,384

(22) Filed: Nov. 26, 2001

(65) Prior Publication Data

US 2002/0122131 A1 Sep. 5, 2002

(30) Foreign Application Priority Data

Nov. 28, 2000 (EP) .................................. 00830780

(51) Int. Cl.
*H04N 5/335* (2006.01)
*H04N 3/14* (2006.01)

(52) U.S. Cl. ................ 348/294; 348/296; 348/297; 348/302; 250/208.1; 250/214 R

(58) Field of Classification Search ................ 348/294, 348/296, 297, 302; 250/208.1, 214 R; 257/292–294, 257/295, 296, 223
See application file for complete search history.

(56) References Cited

U.S. PATENT DOCUMENTS

| 4,902,886 | A | * | 2/1990 | Smisko ................ 250/214 R |
| 5,724,095 | A | | 3/1998 | Shyu et al. ................ 348/300 |
| 5,847,599 | A | * | 12/1998 | Zhang .......................... 330/9 |
| 6,370,270 | B1 | * | 4/2002 | Nair et al. ................ 382/209 |
| 6,631,201 | B1 | * | 10/2003 | Dickinson et al. .......... 382/124 |

FOREIGN PATENT DOCUMENTS

| EP | 0 929 050 | 7/1999 |
| WO | 98/24232 | 6/1998 |

* cited by examiner

*Primary Examiner*—Yogesh K Aggarwal
(74) *Attorney, Agent, or Firm*—Lisa K. Jorgenson; Allen, Dyer, Doppelt, Milbrath & Gilchrist, P.A.

(57) ABSTRACT

The method is for reading a capacitive sensor and may be implemented by a circuit for biasing and reading capacitances that includes circuits for selecting a column line and a row line, and a charge amplifier producing an output voltage representing the capacitance of the selected capacitor intercepted by the selected column and row lines. The method includes preliminarily resetting the output voltage of the charge amplifier, connecting all the deselected row and column plates of the array to a reference voltage and connecting a feedback capacitor and the selected capacitor to an inverting input of the amplifier, applying a step voltage on the capacitor that is connected to the inverting input of the amplifier, and reading the output voltage at steady-state.

17 Claims, 4 Drawing Sheets

METHOD OF READING A CAPACITIVE SENSOR AND RELATED INTEGRATED CIRCUIT

FIELD OF THE INVENTION

The present invention relates to the field of capacitive sensors, and more particularly to methods and integrated systems for reading a plurality of capacitors of a capacitive sensor including an array of capacitors.

BACKGROUND OF THE INVENTION

Capacitive sensors are largely used as contact or pressure sensors. According to a particular embodiment, they may comprise an array of capacitors ordered in rows and columns connected through row and column lines (or plates), as schematically depicted in FIG. 1. These sensors produce a distribution map of the pressure even on a relatively large surface. The capacitance of each single capacitor of these sensors depends on the degree of deformation undergone by the dielectric layer of the capacitor, induced by a compressive force exerted thereon. By reading the values of the capacitances of all the capacitors of the array, an "array" of values ("frame") describing the spatial distribution of the pressure field on the sensing surface of the sensor is obtained.

The pressure field on the sensing surface may be easily displayed by a gray scale image, in which the luminance of each pixel is a function of the measured capacitance of a corresponding capacitor of the array.

Several problems have so far prevented realization of relatively low cost systems for reading such capacitive pressure sensors with good precision and with a great flexibility of use such to make them usable in particularly demanding applications. The precision of the sensing (reading) system of these sensors is negatively affected by the fact that the reading of the capacitance of a capacitor of the array is disturbed by the presence of the other capacitors and by parasitic capacitances between adjacent rows and columns. The capacitances affecting the reading of a single capacitor may add up to be 2 or 3 orders of magnitude greater than the capacitance of the selected capacitor being read to be detected. Moreover, a truly multipurpose system suitable to be used in many types of applications should work properly even if it is necessary to vary from time to time the number of addressable rows and columns of the array, depending on the particular application.

SUMMARY OF THE INVENTION

It is an object of the present invention to provide a method and a system for reading a capacitive sensor that overcomes the above mentioned problems. The system of the invention can be realized in monolithic form and at a relatively low cost and may be used with sensors of different numbers of rows and columns.

More precisely the invention includes a method for reading a capacitive sensor formed by an array of capacitors ordered in rows and columns functionally connected through row lines, each one electrically constituting a first plate in common to all the capacitors of a row, and through column lines, each one electrically constituting a second plate in common to all the capacitors of a column; the two sets of plates being orthogonal or quasi-orthogonal to each other. The method of the invention may be implemented by a circuit for biasing and reading capacitances that includes circuits for selecting a column line and a row line, and a charge amplifier producing an output voltage representing the capacitance of the selected capacitor intercepted by the selected column and row lines.

The method includes preliminarily resetting the output voltage of the charge amplifier, connecting to a reference voltage all the deselected row and column plates of the array and connecting an auxiliary capacitor and the selected capacitor to an inverting input of the amplifier and as feedback capacitor of the amplifier, respectively, or vice versa, and applying a step voltage on the capacitor that is connected to the inverting input of the amplifier and reading the output voltage at steady-state.

The reading method of the invention contemplates the scanning of all the capacitors of the array, to obtain as many values of capacitances. This "array" of values may be periodically updated at a certain "frame frequency", to display the way the distribution map of the pressure on the sensor area evolves in time.

The integrated reading system for a capacitive sensor of the invention comprises an input interface circuit connected to the capacitive sensor, forcing to a reference potential all deselected row plates and the column plates of the array and coupling to a biasing and reading circuit of the system the selected capacitor intercepted by the selected row and the selected column. The system also includes a biasing and reading circuit, producing an output voltage representative of the capacitance of the selected capacitor coupled thereto; an analog-to-digital converter in cascade of the biasing and reading circuit converting the representative voltage in a corresponding bit vector; a microprocessor unit controlling the functioning of the system; and an output interface circuit functionally coupled to the microprocessor unit, outputting the read values of capacitance.

BRIEF DESCRIPTION OF THE DRAWINGS

The different aspects and advantages of the invention will become even more evident through the following detailed description of several embodiments and by referring to the attached drawings, wherein.

DETAILED DESCRIPTION OF THE PREFERRED EMBODIMENTS

Figure 1:
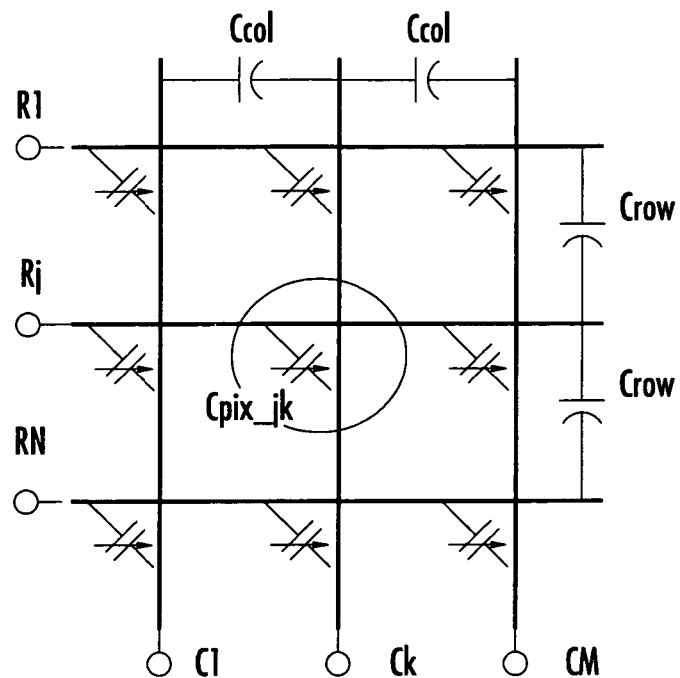
FIG. 1 is a schematic diagram depicting the array of capacitors of a capacitive sensor.
Figure 2:
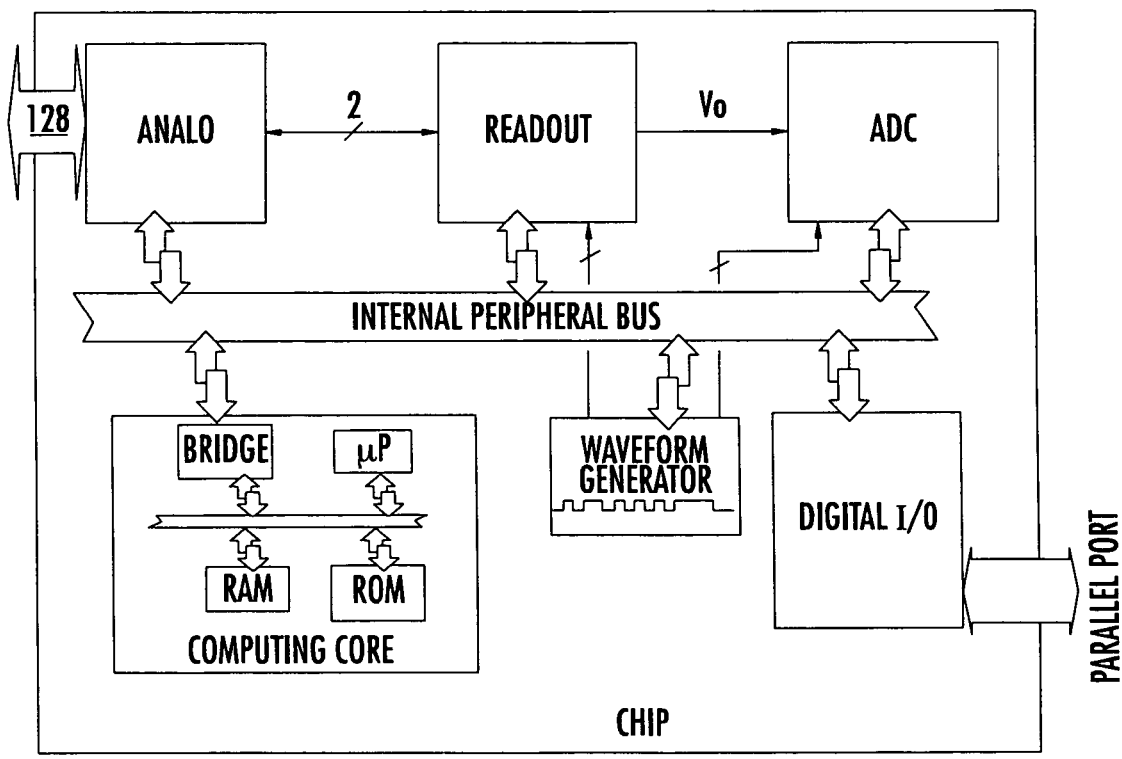
FIG. 2 is a functional diagram of the integrated system of the invention according to a preferred embodiment.

A preferred embodiment of the system of the invention, that may be readily integrated, is depicted in FIG. 2, in the form of block diagram. It includes an input interface block A$_{NA}$IO, a biasing and reading block R$_{EADOUT}$, an analog to digital conversion block ADC, a control block C$_{OMPUTING}$ C$_{ORE}$ and an output digital interface D$_{IGITAL}$I/O. In practice, the input interface ANAIO couples the selected capacitor $C_{PIX}$ to be read to the biasing and reading circuit READOUT producing a voltage signal $V_o$ representative of the capacitance of the read capacitor and grounds the plates of substantially all deselected capacitors of the sensor array. An analog-to-digital converter ADC converts the analog voltage $V_0$ in a corresponding multibit datum of bit vector.

The processing and control function are executed via an internal bus INTERNAL PERIPHERAL BUS by a control block COMPUTING CORE that comprises a microprocessor unit μP, ROM, RAM and BRIDGE. The control may also optionally and preferably involve a waveform generator WAVEFORM GENERATOR. This generator WAVEFORM GENERATOR that is controlled by the microprocessor unit, generates the signals for synchronizing the various functioning phases of the circuit READOUT and of the analog-to-digital conversion circuit ADC of the voltage $V_o$. The use of a dedicated generator WAVEFORM GENERATOR is particularly convenient, because it facilitates the programming of an optimized generation of such timing signals. A suitable waveform generator can be easily implemented by employing a ring register that is configured by a finite states machine controlled by the microprocessor unit, as will be readily recognized by a skilled technician.

Figure 3:
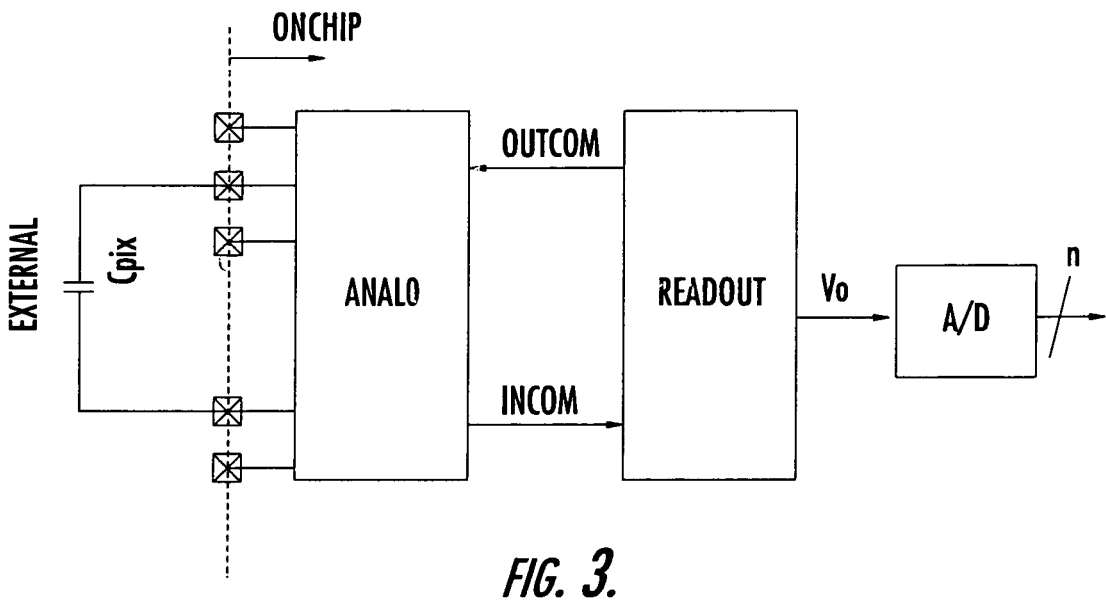
FIG. 3 is a detailed diagram of the input interface of the system of the invention.

The actual connections of input interface block are stage is depicted in a greater detail in FIG. 3. The interface ANAIO is connected to the capacitive array sensor through a plurality of pins of the chip, for coupling the selected row and column plates (lines) of capacitors of the sensor to the circuit READOUT.

Figure 4:
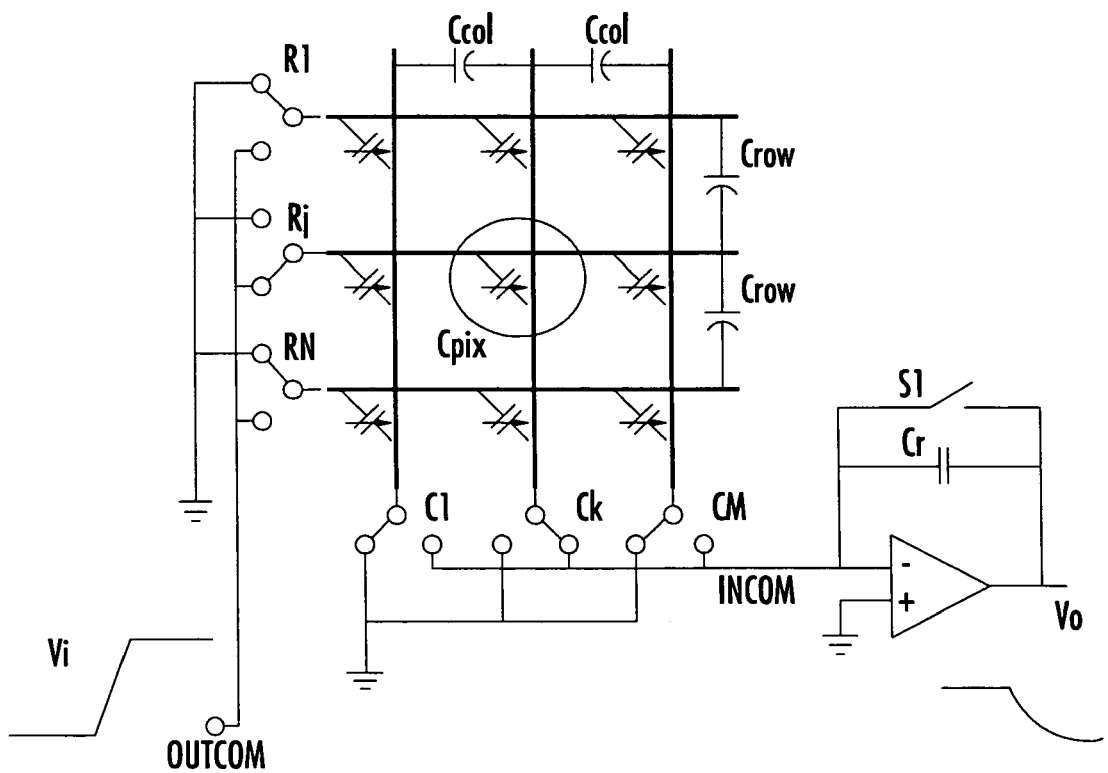
FIG. 4 is a schematic diagram showing a biasing and reading circuit according to a first embodiment of the invention.
Figure 5:
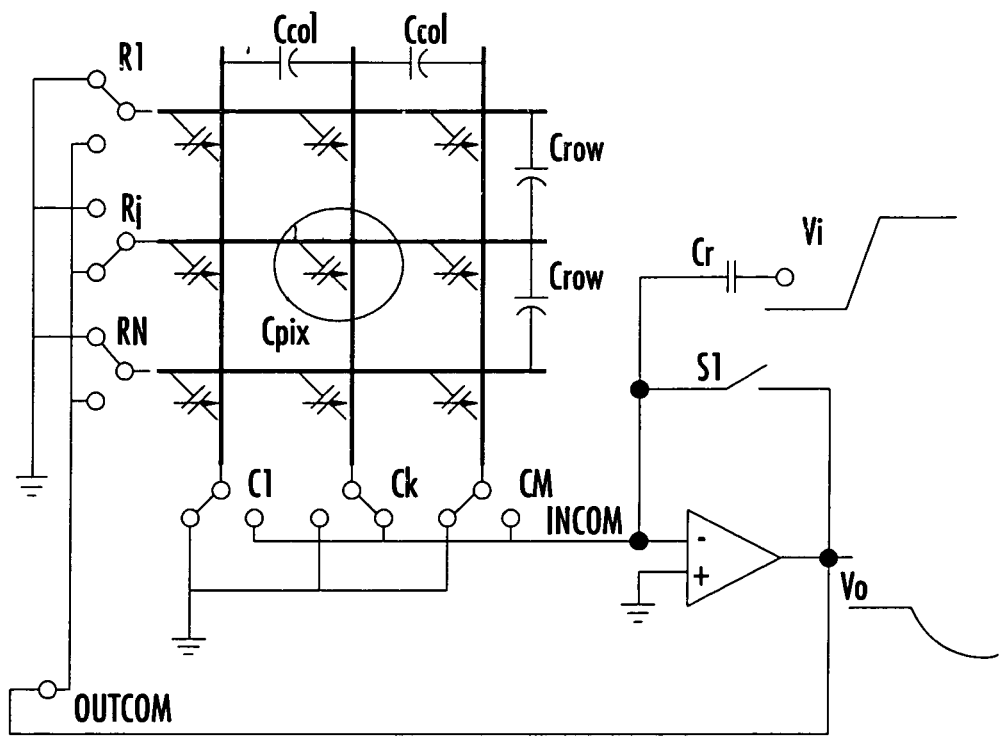
FIG. 5 is a schematic diagram showing a biasing and reading circuit according to another embodiment of the invention.

Two alternative embodiments of the system of the invention are exemplified in FIGS. 4 and 5. Both employ a charge amplifier that represents the sensing element of the READOUT block. The charge amplifier is constituted by an operational amplifier with a non inverting input (+) connected to a ground potential and an inverting input (−) that is coupled to the capacitor to be read and to a feedback capacitor.

According to the embodiment depicted in FIG. 4, the selected capacitor $C_{PIX}$ to be read is coupled to the input (−) of the operational amplifier, while the feedback capacitor $C_R$ is a conventionally connected and is dischargeable by the short-circuiting switch S1.

The method of reading the capacitance of $C_{PIX}$ includes:
(a) resetting the voltage $V_o$ by momentarily closing the switch S1;
(b) connecting the selected row and column plates to a reference potential;
(c) applying a step voltage $V_I$ to the selected capacitor $C_{PIX}$ connected to the input (−) of the amplifier, sensing at steady-state the voltage $V_o$.

In this way, the voltage $V_o$ is subject to a variation $\Delta V_O$ proportional to the variation $\Delta V_I$ of the voltage $V_I$, according to the following formula:

$$\Delta V_O = \Delta V_I \cdot \frac{C_{PIX}}{C_R}$$

The charge injection into the feedback capacitor $C_R$, by the neighboring capacitors of the selected capacitor and by the parasitic capacitances $C_{COL}$ and $C_{ROW}$, is effectively nullified because all deselected rows and columns are grounded.

According to an alternative embodiment, depicted in FIG. 5, connection of the selected capacitor Cpix and of the feedback capacitor Cr may be inverted by connecting the selected capacitor $C_{PIX}$ to be read as feedback capacitor and by connecting the auxiliary capacitor $C_R$ to the input (−) of the amplifier. According to this alternative embodiment of the biasing and sensing circuit there will be a variation of the output voltage $\Delta V_O$ given by $$\Delta V_O = \Delta V_I \cdot \frac{C_R}{C_{PIX}}$$

that is the output voltage presents a variation that, differently from the first embodiment, is inversely proportional to the selected capacitance $C_{PIX}$.

Figure 6:
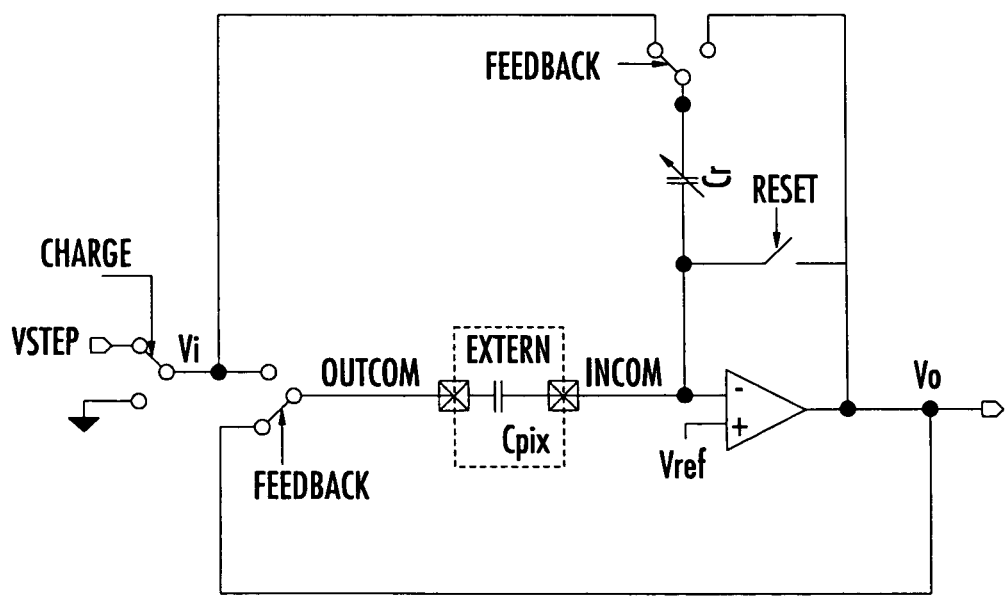
FIG. 6 is a schematic diagram shows a preferred embodiment of the biasing and reading circuit suited to implement any of the two different embodiments of the method of the invention.

The two alternative configurations of FIGS. 4 and 5 may be implemented with the same integrated circuit as the one depicted in FIG. 6, in which, by acting on the configuration switches controlled by a logic signal FEEDBACK, the selected capacitor to be read $C_{PIX}$ may be coupled to the input and the auxiliary capacitor $C_R$ connected as feedback capacitor to the charge amplifier or viceversa.

Figure 7:
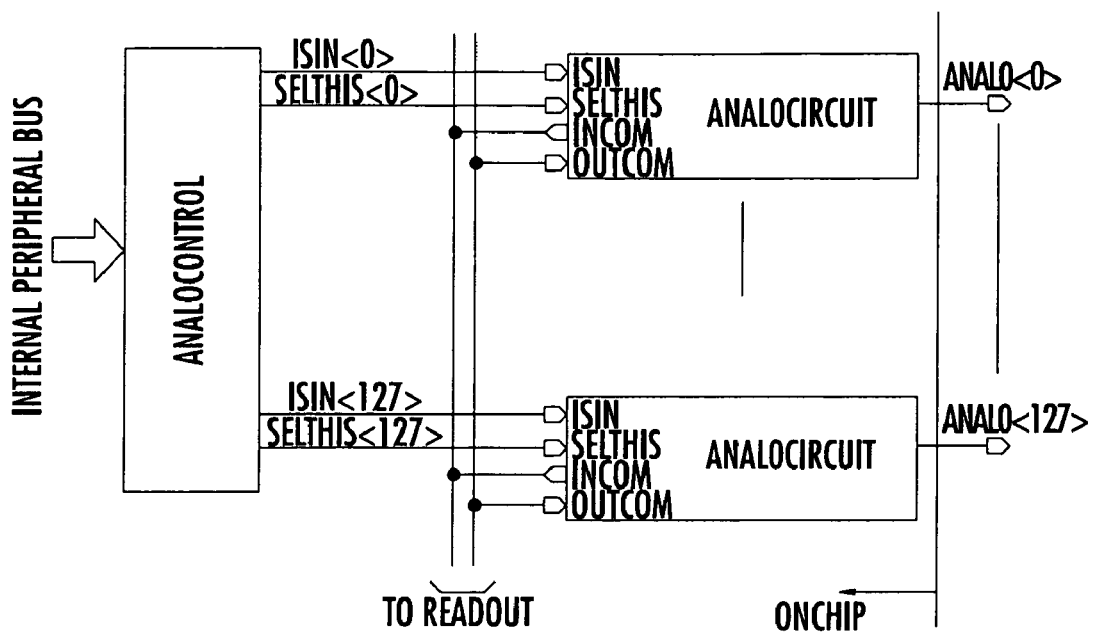
FIG. 7 is a functional diagram of the input interface circuit.
Figure 8:
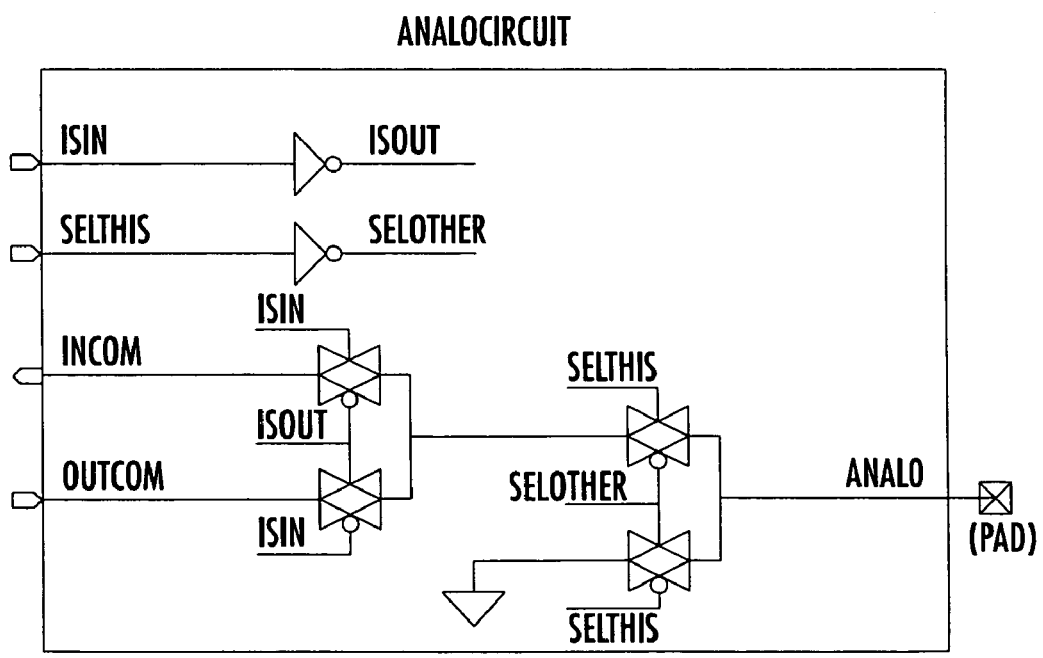
FIG. 8 is a schematic diagram showing an embodiment of the circuit for coupling the selected capacitor to be read to the biasing and reading circuit.

To make the input interface ANAIO suited to support array sensors of different number of rows and columns, it is realized, as depicted in FIG. 7, by a plurality of identical connection modules ANAIOCIRCUIT, each connected to a respective pin that are controlled by a dedicated selection logic ANAIOCONTROL. Each connection module ANAIOCIRCUIT, that may be realized as depicted in FIG. 8, connects a respective row or column of the sensor array to a reference potential or to the biasing and reading circuit READOUT, in function of selection signals ISIN, SELTHIS that are generated by a selection logic circuit controlled by the microprocessor unit.

A monolithically integrated system of the invention with such a modular input interface circuit, may be used with capacitive sensors having any number of rows and columns of capacitors, provided that the sum of the number of rows and columns does not exceed the number of input channels (modules) of the input interface. In the case the modules of the input interface of the device are more numerous than the sum of rows and columns of the array of capacitors of the sensor to be used, the redundant connection circuits that are not used for coupling a respective row or column connect the respective pin of the device to a reference potential, as if they were connected to deselected rows or columns, without affecting the normal functioning of the integrated system.

Naturally, the method of the invention can be implemented by sequentially scanning the capacitors of the array for producing an array of values representing the map distribution of the quantity (pressure) detected by the capacitive sensor. Such a sequential scan may be repeated with a desired frequency ("frame frequency") for continuously refreshing the image of the distribution map of the pressure on the sensing area of the sensor.

Each frame of values so produced may be subjected by the microprocessor unit to noise filtering and to appropriate real-time correction processes such as the "gamma correction" and the "fixed pattern noise cancellation", before being output through a conventional digital output interface DIGITAL I/O. To these purposes, the microprocessor unit will include a RAM of sufficient capacity for storing calculated capacitance values, besides a conventional ROM for storing information relating system's configuration and to the communication protocol employed.

That which is claimed is:
1. A method of reading a capacitive pressure sensor comprising an array of pressure-sensing capacitors ordered in rows and columns functionally connected through row lines and through column lines substantially orthogonal to each other, using a biasing and reading circuit comprising column and row selectors, and a charge amplifier outputting a voltage of the pressure based capacitance of a selected pressure-sensing capacitor of the array, the method comprising:

resetting an output voltage of the charge amplifier;

connecting nonselected row and column lines of the array to a reference voltage while connecting one of an auxiliary capacitor and the selected pressure-sensing capacitor to an input of the amplifier while connecting the other one of the auxiliary capacitor and the selected pressure-sensing capacitor to define a feedback capacitor of the amplifier, the feedback capacitor being discharged by the connection of the nonselected row and column lines of the array to the reference voltage; and applying a step voltage on the one of the auxiliary capacitor and the selected pressure-sensing capacitor that is connected to the input of the amplifier and reading the output voltage at steady-state.

2. The method of claim 1, further comprising sequentially scanning the pressure-sensing capacitors of the array to obtain a frame of pressure based capacitance values of the capacitive pressure sensor.

3. The method of claim 2, wherein the scanning is repeated at a predetermined frame frequency.

4. A method of reading a capacitive pressure sensor comprising an array of pressure-sensing capacitors connected in rows and columns, the method comprising:

providing a biasing and reading circuit comprising
column and row selectors,
an amplifier, connected to the column and row selectors, for outputting a voltage of the pressure based capacitance of a selected pressure-sensing capacitor of the array, and
an auxiliary capacitor connected to the column and row selectors;

connecting nonselected rows and columns of the array to a reference voltage while connecting one of the auxiliary capacitor and the selected pressure-sensing capacitor as an input of the amplifier while connecting the other one of the auxiliary capacitor and the selected pressure-sensing capacitor to define a feedback capacitor of the amplifier, the feedback capacitor being discharged by the connection of the nonselected row and column lines of the array to the reference voltage; and applying a step voltage on the one of the auxiliary capacitor and the selected pressure-sensing capacitor that is connected on the input of the amplifier and reading the output voltage at steady-state.

5. The method of claim 4, further comprising resetting the output voltage of the charge amplifier.

6. The method of claim 4, further comprising sequentially scanning the pressure-sensing capacitors of the array to obtain a frame of capacitance values of the capacitive pressure sensor.

7. The method of claim 6, wherein the scanning is repeated at a predetermined frame frequency.

8. A system for reading a capacitive pressure sensor comprising an array of pressure-sensing capacitors connected in rows and columns, the system comprising:

a biasing and reading circuit comprising an amplifier for outputting a voltage representing the pressure based capacitance of a selected pressure-sensing capacitor, an auxiliary capacitor, configuration switches for coupling one of the auxiliary capacitor and the selected pressure-sensing capacitor as a feedback capacitor and for coupling the other of the auxiliary capacitor and the selected pressure-sensing capacitor to an input of the amplifier, and an analog-to-digital converter for converting the output voltage to digital data;

an input interface circuit for connecting deselected row lines and column lines of the array to a reference voltage and while coupling the selected pressure-sensing capacitor of the capacitive pressure sensor to the biasing and reading circuit, the feedback capacitor being discharged by the connection of the deselected row and column lines of the array to the reference voltage;

a microprocessor for performing noise filtering and real-time correction of data; and a digital output interface circuit controlled by the microprocessor for outputting the digital data representing read values of capacitance of the capacitive pressure sensor.

9. The system according to claim 8, wherein the input interface circuit comprises row and column selectors; and further comprising a timing signal generator, controlled by the microprocessor, for generating timing signals for the row and column selectors, for the biasing and reading circuit and for the converter, for synchronizing the operation phases of the circuits.

10. The system of claim 9, wherein the waveform generator comprises:

a shift register for cyclically producing the timing signals with a certain frequency; and a finite states machine, controlled by the microprocessor unit, for configuring the shift register.

11. The system according to claim 8, wherein the input interface circuit comprises:

a selection logic circuit controlled by the microprocessor unit for producing selection signals; and a plurality of connection modules for connecting the deselected rows and columns to the reference voltage, and for coupling the selected pressure-sensing capacitor to the biasing and reading circuit based upon the selection signals.

12. An integrated circuit for reading a capacitive pressure sensor comprising an array of pressure-sensing capacitors connected in rows and columns, the circuit comprising:

column and row selectors;

an amplifier, connected to the column and row selectors, for outputting a voltage of the pressured-based capacitance of a selected pressure-sensing capacitor of the array;

an auxiliary capacitor connected to the column and row selectors;

configuration switches for connecting deselected row lines and column lines of the array to a reference voltage and while coupling one of the auxiliary capacitor and the selected pressure-sensing capacitor as a feedback capacitor and for coupling the other of the auxiliary capacitor and the selected pressure-sensing capacitor to an input of the amplifier, the feedback capacitor being discharged by the connection of the deselected row and column lines of the array to the reference voltage; and a controller for controlling the configuration switches.

13. The circuit according to claim 12, further comprising:

an analog-to-digital converter for converting the output voltage to digital data; and a digital output interface circuit for outputting the digital data representing read values of capacitance of the capacitive pressure sensor.

14. The circuit according to claim 12, wherein the controller comprises a timing signal generator for generating timing signals for the row and column selectors.

15. A capacitive pressure sensor device comprising:
an array of pressure-sensing capacitors connected in rows and columns; and
a reading circuit for reading the array of pressure-sensing capacitors and comprising
- column and row selectors,
- an amplifier, connected to the column and row selectors, for outputting a voltage of the pressure-based capacitance of a selected pressure-sensing capacitor of the array,
- an auxiliary capacitor connected to the column and row selectors,
- configuration switches for connecting deselected row lines and column lines of the array to a reference voltage and while coupling one of the auxiliary capacitor and the selected pressure-sensing capacitor as a feedback capacitor and for coupling the other of the auxiliary capacitor and the selected pressure-sensing capacitor to an input of the amplifier, the feedback capacitor being discharged by the connection of the deselected row and column lines of the array to the reference voltage, and
- a controller for controlling the configuration switches.

16. The device according to claim 15, wherein the reading circuit further comprises:
- an analog-to-digital converter for converting the output voltage to digital data; and
- a digital output interface circuit for outputting the digital data representing read values of pressure-based capacitance of the capacitive pressure sensor.

17. The device according to claim 15, wherein the controller comprises a timing signal generator for generating timing signals for the row and column selectors.

* * * * *

UNITED STATES PATENT AND TRADEMARK OFFICE
CERTIFICATE OF CORRECTION

PATENT NO. : 7,755,683 B2  Page 1 of 1
APPLICATION NO. : 09/994384
DATED : July 13, 2010
INVENTOR(S) : Sergio et al.

It is certified that error appears in the above-identified patent and that said Letters Patent is hereby corrected as shown below:

Column 2, Line 7  Delete: "as"
Insert: -- a --

Column 2, Line 50  Delete: "shows"
Insert: -- showing --

Column 3, Line 24  Delete: "are stage is"
Insert: -- stages are --

Column 3, Line 40  Delete: "a"

Column 3, Line 65  Delete: "Cr"
Insert: -- $C_R$ --

Signed and Sealed this
Twenty-first Day of June, 2011

David J. Kappos
*Director of the United States Patent and Trademark Office*